United States Patent [19]

Goodman et al.

[11] 3,956,249

[45] May 11, 1976

[54] MANUFACTURE OF POLYVINYL CHLORIDE OF LOW VINYL CHLORIDE MONOMER CONTENT BY TREATMENT OF WET POLYVINYL CHLORIDE

[75] Inventors: Donald Goodman, Flemington; Robert S. Miller, Bridgewater; Robert J. Stanaback, Gladstone, all of N.J.

[73] Assignee: Tenneco Chemicals, Inc., Saddle Brook, N.J.

[22] Filed: June 24, 1974

[21] Appl. No.: 482,114

[52] U.S. Cl. .............................. 528/500; 526/344; 526/345
[51] Int. Cl.² .............. C08F 214/06; C08F 220/40; C08F 6/00
[58] Field of Search ........ 260/92.8 A, 87.1, 92.8 W; 450/770, 774.5, 775

[56] References Cited

UNITED STATES PATENTS

| | | | |
|---|---|---|---|
| 2,389,958 | 11/1945 | Crawford et al. | 260/92.8 A |
| 3,052,663 | 9/1962 | Bodlaender et al. | 260/92.8 A |
| 3,553,186 | 1/1971 | Schnoring et al. | 260/92.8 A |

*Primary Examiner*—Joseph L. Schofer
*Assistant Examiner*—Maria S. Tungol
*Attorney, Agent, or Firm*—Evelyn Berlow

[57] ABSTRACT

Vinyl chloride is removed from wet cakes that comprise a vinyl chloride polymer, vinyl chloride, and water by contacting the wet cakes with steam, preferably at atmospheric pressure and at a temperature in the range of 100° to 125°C.

7 Claims, No Drawings

3,956,249

MANUFACTURE OF POLYVINYL CHLORIDE OF LOW VINYL CHLORIDE MONOMER CONTENT BY TREATMENT OF WET POLYVINYL CHLORIDE

SUMMARY OF THE INVENTION

The invention relates to a process whereby vinyl chloride monomer (VCM) is removed from the wet cake produced during or after centrifuging or otherwise dewatering in the suspension process for producing poly(vinyl chloride) (PVC). Steam is passed through the wet cake, thereby removing VCM from the resin. As a result the PVC has less VCM associated therewith, for example, ten parts per million (weight/-weight), or even as low as not to be detected by gas chromatography with a sensitivity of analyzing 0.1 ppm VCM. "Wet cake" is meant to include PVC homopolymers and copolymers containing from 1 to 50% (wt./wt.) of water and having particle sizes in the range of about 1 to 500 microns in diameter. The preferred embodiment is in-process application of steam to the wet cake so that the VCM may be condensed, compressed, or otherwise captured. Also included is the treatment of the resin after a drying step to obtain PVC of low VCM content.

BACKGROUND OF THE INVENTION

From a commercial standpoint, vinyl chloride homopolymers and copolymers of vinyl chloride and other monomers, such as vinyl acetate, are among the most important polymers presently produced.

In the suspension or emulsion process, the polymerization reaction is conventionally carried out in an agitated reactor, from which the slurry or latex produced as a result of the polymerization reaction is stripped in the reactor at a temperature below about 65°C., or sometimes transferred to a hold tank, otherwise known as a stripper. A vacuum is applied to the reactor/stripper to remove monomer, and the slurry or latex is subsequently dewatered and dried to produce dried resin. The difficulty is, however, that this procedure, as conventionally practiced, results in the production of a slurry or latex of high vinyl chloride monomer content, for example, 100–15,000 parts per million (weight/-weight), which results upon conventional processing in giving a dried (less than 1.0% moisture) resin with a VCM content of 100 ppm VCM or more.

An alternate and equally satisfactory approach is to treat the wet poly(vinyl chloride) in other than slurry or latex form; viz., "wet cake" form. Steam is used to treat the wet PVC homopolymer or copolymer either in process or after a drying step.

The removal of VCM from the wet PVC into equipment suitable for condensing, compressing or otherwise capturing the VCM reduces the concentration of VCM released into operating areas. The reduction of VCM levels in the air in working areas is required for safe plant operation. There is recent evidence that vinyl chloride monomer may be a cause of a rare liver cancer, known as angiosarcoma. Note Federal Register, Vol. 39, No. 92 — Friday, May 10, 1974 — pages 16896–16900.

An additional benefit is that the VCM captured is added to the recovered monomer pool, thereby improving polymerization efficiency and economy. The added captured monomer accounts for about an additional one to four percent of the total VCM charged.

Poly(vinyl chloride) homopolymer and copolymers of vinyl chloride and other monomers are conventionally subjected to hot operations, such as milling, calendering and extruding, which release vinyl chloride monomer associated with the homopolymer or copolymer. There is therefore a need in the art for a procedure whereby there can be produced a homopolymer or copolymer of reduced vinyl chloride monomer content. This invention answers that need.

In the suspension process, vinyl chloride homopolymer and copolymers of vinyl chloride and other monomers are prepared by suspending the vinyl chloride monomer alone or in a mixture with other monomers in water by suspending agents and agitation. The polymerization is started by means of a suitable free radical generating polymerization initiator, such as lauroyl peroxide, benzoyl peroxide, diisopropylperoxydicarbonate, tertiary butylperoxypivalate, azobisisobutyronitrile, azobis-2,4-dimethylvaleronitrile, combinations of dialkylperoxydicarbonates and lauroyl peroxide, sulfonyl peroxides and the like. Suspending agents such as methylcellulose, hydroxymethylcellulose, hydroxyethylcellulose, hydroxypropylmethylcellulose, hydrolyzed polyvinyl acetate, poly(vinyl alcohol), gelatin, methyl vinyl ether-maleic anhydride copolymers and combinations of the above are included in the reaction mixtures.

For the emulsion process, vinyl chloride homopolymer and copolymers of vinyl chloride and other monomers are prepared by conventional emulsion polymerization techniques. Free radical initiators, such as hydrogen peroxide, organic peroxides, persulfates, and redox systems are used. Surface active agents, such as alkyl sulfates, alkane sulfonates, alkylaryl sulfonates and fatty acid soaps, are employed to emulsify the vinyl chloride monomer and comonomers, if any. An alternate method of dispersion resin preparation is described in U.S. Pat. No. 2,981,722 to Enk et.al., granted Apr. 25, 1961.

When a copolymer of vinyl chloride and other monomers is prepared, the weight percent of the monomer, or mixtures of monomers, other than vinyl chloride can be up to thirty weight percent, based upon the total weight of the vinyl chloride and the other monomer or monomers copolymerized with the vinyl chloride. Among the monomers which can be copolymerized with the vinyl chloride are:
acrylic acid
acrylonitrile
n-butyl acrylate
diallyl maleate
dibutyl maleate
diethyl fumarate
dimethyl itaconate
ethyl acrylate
ethylene
isobutylene
maleic anhydride
methacrylic acid
methacrylonitrile
methyl acrylate
methyl vinyl ether
2-ethylhexyl acrylate
propylene
triallyl cyanurate
triallyl isocyanurate
trimethylolpropane trimethacrylate
vinyl acetate N-vinylcarbazole
vinylidene chloride
vinyl isobutyl ether
N-vinylpyrrolidone Further details concerning the production of vinyl chloride homopolymer and copolymers of vinyl chloride and other monomers by suspension and emulsion polymerization are set forth in Kirk-Othmer, Encyclopedia of Chemical Technology, Second Edition, Volume 21, pages 373–379.

In accordance with this invention, unreacted vinyl chloride is removed from wet PVC other than the slurry or latex, by the application of steam to the wet PVC, so that vinyl chloride vapor in a further amount is removed from the wet PVC. Treatment of the wet PVC with steam can be used in conjunction or in place of stripping of the PVC slurry or latex to complete VCM removal. When used in conjunction with stripping of the PVC slurry or latex, the steam treatment can be used to "polish" or remove the last traces of vinyl chloride monomer to no detectable levels as determined by gas chromatography.

It is pointed out that the processing of PVC and copolymers of vinyl chloride and other monomers with steam at 100°C. or higher temperature is contrary to the teachings of the art, inasmuch as the art is aware that severe heating decomposes PVC and the copolymers.

An important feature of this invention is that the steam treatment of wet PVC can be completed within several minutes, so that polymerization turn-around time is not appreciably lengthened. The operation is preferably carried out at about atmospheric pressure using steam having a temperature of about 100°C. to 125°C.

The following examples illustrate the invention and are not limitative thereof.

EXAMPLE 1 TO 3

In each of the Examples (see Table I), a slurry of a homopolymer of vinyl chloride produced by the suspension process and containing about 30 percent by weight of the polymer was centrifuged to produce wet cake. Table I gives the vinyl chloride monomer content of each of the three wet cakes used. Each wet cake steamed contained about 13 percent by weight of water.

Resin A was prepared using a mixture of lauroyl peroxide and di-2-ethylhexylperoxydicarbonate as the initiator and methyl cellulose as the suspension agent. Resin B was prepared using the initiator of Resin A, hydroxypropylmethylcellulose as the suspension agent, and trichloroethylene as a chain transfer agent.

Each wet cake was steamed at the temperature and pressure and the times shown in Table I. The VCM concentrations are concentrations of vinyl chloride monomer in ppm (weight/weight), based upon the weight of the resin.

EXAMPLE 4

About 500 grams of a slurry of a copolymer of vinyl chloride and vinyl acetate (vinyl acetate content of about one to six percent by weight) containing about 30 percent by weight of the copolymer was charged to a rotary centrifuge. The copolymer was prepared using lauroyl peroxide as the initiator and gelatin as the suspension agent. Trichloroethylene was used as a chain transfer agent.

The centrifuge cake contained 249 ppm VCM, based on the weight of the resin. The cake was contacted with steam (temperature about 100°C.) for periods of 5, 10 and 15 minutes. After treatment for those periods of time, the resin contained three ppm VCM, one ppm VCM and a non-detectable amount of VCM, respectively.

EXAMPLE 5

500 grams of polyvinyl chloride homopolymer latex prepared as described in U.S. Pat. No. 2,981,722 to Enk et.al., granted Apr. 25, 1961, was charged to a rotary centrifuge. The resultant wet cake contained 7409 ppm VCM, based on the weight of the resin. After sparging with steam (temperature about 100°C) for five minutes, the resin contained nondetectable level of VCM as determined by gas chromatography.

EXAMPLE 6

A sample of the slurry of Example 1 was centrifuged and dried to produce a quantity of resin having a VCM content of 243 ppm and a water content of less than one percent by weight.

500 grams of the dried resin was placed in a laboratory scale fluid bed drier and fluidized with steam (temperature about 100°C.–105°C.) for about ten minutes. The VCM content of the resin then was non detectable, as determined by gas chromatography. The resin was then fluidized with air (inlet temperature 110°C., outlet temperature 100°C) for one minute. The final dry resin contained no detectable concentration of VCM.

TABLE I

| Example | Resin | Initial VCM Concentration (ppm) | Steam Treatment | Temp. (0°C.) | Pressure | VCM Concentration (ppm) 5 min. | 10 min. | 15 min. |
|---|---|---|---|---|---|---|---|---|
| 1 | A | 6625 | Wet Cake | 100–105 | Atmos. | 133 | 21 | |
| 2 | A | 3300 | Wet Cake | 100–105 | Atmos. | 128 | 19 | 3 |
| 3 | B | 938 | Wet Cake | 100–105 | Atmos. | 45 | 12 | 2 |

We claim:
1. In suspension and emulsion polymerization processes for the production of vinyl chloride polymers selected from the group consisting of polyvinyl chloride and copolymers of vinyl chloride and at least one monomer copolymerizable therewith wherein a wet cake consisting essentially of said vinyl chloride polymer, water, and vinyl chloride is formed and vinyl chloride is separated from said wet cake, the improvement that comprises removing vinyl chloride from the wet cake by contacting the wet cake with steam.

2. The process of claim 1 wherein the wet cake is contacted with steam at atmospheric pressure and at a temperature in the range of about 100°C. to 125°C.

3. The process of claim 1 wherein the wet cake is contacted with steam until it contains not more than 10 ppm of vinyl chloride.

4. The process of claim 3 wherein the wet cake is contacted with steam until it contains an amount of vinyl chloride that is undetectable by a gas chromatograph that is capable of detecting as little as 0.1 ppm of vinyl chloride.

5. The process of claim 1 wherein the vinyl chloride polymer in the wet cake is polyvinyl chloride.

6. The process of claim 1 wherein the vinyl chloride polymer in the wet cake is a copolymer containing vinyl chloride and up to 30% by weight of vinyl acetate.

7. In suspension and emulsion polymerization processes for the production of vinyl chloride polymers selected from the group consisting of polyvinyl chloride and copolymers of vinyl chloride and at least one monomer copolymerizable therewith wherein a wet cake is formed, said wet cake containing vinyl chloride particles that are from 1 micron to 500 microns in diameter, vinyl chloride, and from 1% to 50% by weight of water, and vinyl chloride is separated from said wet cake, the improvement comprising removing vinyl chloride from the wet cake by contacting the wet cake with steam.

* * * * *